United States Patent [19]

Savatier

[11] Patent Number: 5,508,744
[45] Date of Patent: Apr. 16, 1996

[54] VIDEO SIGNAL COMPRESSION WITH REMOVAL OF NON-CORRELATED MOTION VECTORS

[75] Inventor: Tristan Savatier, Los Angeles, Calif.

[73] Assignee: Thomson Consumer Electronics, Inc., Indianapolis, Ind.

[21] Appl. No.: 30,968

[22] Filed: Mar. 12, 1993

[51] Int. Cl.$^6$ .................................................. H04N 7/28
[52] U.S. Cl. ................................. 348/416; 348/699
[58] Field of Search ........................... 348/402, 413,
348/416, 420, 699, 700, 701; 358/430,
428, 261.2, 426; H04N 7/13, 7/137

[56] References Cited

U.S. PATENT DOCUMENTS

| | | | |
|---|---|---|---|
| 4,575,756 | 3/1986 | Furukawa | 348/416 |
| 4,684,984 | 8/1987 | Hirano | 348/416 |
| 4,864,398 | 9/1989 | Avis et al. | 348/443 |
| 5,021,879 | 6/1991 | Vogel | 348/402 |
| 5,036,393 | 7/1991 | Samad et al. | 348/416 |
| 5,148,269 | 9/1992 | de Haan et al. | 348/699 |
| 5,162,907 | 11/1992 | Keating et al. | 348/699 |

FOREIGN PATENT DOCUMENTS

| | | |
|---|---|---|
| 0424-026A2 | 4/1991 | European Pat. Off. . |
| 477616A2 | 4/1992 | European Pat. Off. . |

OTHER PUBLICATIONS

A High–Performance Full–Motion Video Compression Chip by P. A. Ruetz et al., IEEE Transactions on Circuits & Systems for Viodeo Technology, Jun. 1992, vol. 2, No. 2, pp. 111–122.

An All ASIC Implementation of a Low Bit–Rate Video Codec by H. Fujiwara et al., IEEE Transactions on Circuits & Systems for Viodeo Technology, Jun. 1992, vol. 2, No. 2, pp. 123–124.

VLSI Architecture for Block Motion Estimation Algorithm by C. H. Hsieh et al., IEEE Transactions on Circuits & Systems for Viodeo Technology, Jun. 1992, vol. 2, No. 2, pp. 169–175.

*Primary Examiner*—Tommy P. Chin
*Assistant Examiner*—Bryan S. Tung
*Attorney, Agent, or Firm*—Joseph S. Tripoli; Eric P. Herrmann; Ronald H. Kurdyla

[57] ABSTRACT

A video signal compressor includes apparatus for generating motion vectors for respective blocks of video data. Motion vectors, other than those which provide direction to co-located blocks in other frames, are determined to be candidates for conversion to vectors which do provide direction to co-located blocks. However, conversion is precluded if the vector is determined to be correlated with one of the neighboring motion vectors.

6 Claims, 4 Drawing Sheets

VIDEO SIGNAL COMPRESSION WITH REMOVAL OF NON-CORRELATED MOTION VECTORS

This invention relates to motion compensated compression apparatus for processing video data on a block by block basis and more particularly for processing motion vectors associated with respective blocks.

BACKGROUND OF THE INVENTION

Current trends in video signal recording and transmission are leaning toward the use of digital compression techniques. Toward this end the International Organisation for Standardisation has been developing a series of compression signal protocols designated MPEG1, MPEG2, etc. These protocols require that the video signal be compressed according to motion compensated prediction techniques in which the video signal is divided into matrices or blocks of contiguous pixels and thereafter the signal is processed on a block basis.

In typical motion compensated predictive compression successive images are predicted from prior compressed images. The current image is subtracted, on a pixel by pixel basis, from its associated predicted image, and the differences or residues are encoded for storage or transmission. In generating the predicted images, blocks of the current image are compared with like sized blocks of the predicted image until the closest block match is found. A set of motion vectors is generated which indicate the block of the predicted image which most nearly matches the real image. The differences between the two blocks and the motion vectors form, in major part the compressed information. The residues may however undergo transform processing and variable length and statistical encoding. For detailed information on motion compensated predictive compression see Peter A. Ruetz et.al. "A High-Performance Full-Motion Video Compression Set", or Hiroshi Fujiwara, et.al "An AII-ASIC Implementation of a Low Bit-Rate Video Codec" and Chaur-Heh Hsieh, et.al. "VLSI Architecture for Block-Matching Motion Estimation Algorithm" all of which are to be found in IEEE TRANS. ON CIRCUITS AND SYSTEMS FOR VIDEO TECHNOLOGY, VOL. 2, No. 2, JUNE 1992. In certain systems such as the MPEG 1 system, a decision is made whether to code a set of motion vectors or not. This is called a MC/no-MC decision.

The purpose of the MC/no-MC decision is to determine for each block of compressed data whether to select the motion vector(s) resulting from the motion estimation search (MC), or to select (0,0) motion vectors (no-MC) instead. The MC/no-MC decision is applied to each block of the Picture. If the particular system performs both forward and backward prediction as in the MPEG systems a MC/no-MC decision is made independently for both forward and backward motion vectors.

The no-MC motion vector should be used in those cases where the MC motion vector is useless (it carries no information) and is costly to encode, that is, it tends to create an effect of swarming noise, and makes error concealment techniques less efficient. This situation obtains particularly in flat image areas, like a sky, or a wall, etc, where the MC motion vectors tend to be totally random and are the result of random noise present in the source pictures during the motion estimation search, and not due to scene changes.

Typical MC/no-MC decision algorithms are based on prediction errors. Prediction errors can be the MAE (Mean Absolute Error per pixel) or the MSE (Mean Square Error per pixel) between the predicted block and the target block. Nominally a no-MC decision is made if the spatially collocated predicted and target blocks yield the smallest prediction error. In addition, if the smallest prediction error generated in a block matching search, is produced by the target block and a non collocated block, and this prediction error is less than the prediction error of the collocated target and predicted blocks by only a predetermined threshold, a no-MC decision is made. The optimum threshold needs to be determined by experiment for respective systems. It has been found however that if the MSE is used as a prediction error a threshold of 1 provides good results.

If a no-MC decision is made for a particular block this implies a motion vector set of (0, 0). This vector set can be encoded as a vector or the block of residue data can be flagged as a no-MC block without the necessity of including the vector, thereby enhancing compression efficiency.

The foregoing MC/no-MC decision algorithm produces a very annoying side effect, called herein the "dirty window effect". It appears like dirt sticking to the screen in flat areas (where no-MC motion vectors are used), and can be very obvious and disturbing. The cause of the problem is that the no-MC motion vectors are used in areas almost flat, but containing in fact a very low intensity pattern such as a blurred background, or a cloud for example. This problem can be solved by lowering the value of the threshold used in the decision, however, this gives rise to another problem. The prediction error caused by noise becomes larger than the threshold and no-MC motion vectors will seldom be used, causing what can be described as a swarming noise effect.

The present invention is directed to apparatus which takes advantage of MC/no-MC decisions without incurring the undesirable "dirty window" or "swarming noise effects."

SUMMARY OF THE INVENTION

The present invention comprises a motion vector producing apparatus for generating motion vectors indicative of the relative motion of respective blocks of video data between image intervals. This apparatus includes circuitry for performing block matching to produce the respective motion vectors, and apparatus for performing a MC/no-MC decision based upon, for example, prediction errors. The motion vectors are stored so that a plurality of vectors for a corresponding plurality of contiguous blocks may be concurrently made available. Motion vectors associated with respective blocks are tested for correlation with motion vectors associated with neighboring blocks. Motion vectors for which no correlation exists and for which a MC to no-MC decision has been made are then converted to zero-valued motion vectors.

DETAILED DESCRIPTION

This present MC/no-MC processor was designed in order to avoid selecting no-MC motion vectors in situations where it would cause the dirty window effect. It has been observed in various scenes where the dirty window effect was present, that the motion vector field was quite correlated even in the areas where no-MC motion vectors were selected. On the other hand, in the areas where no-MC motion vectors were selected and no dirty window effect was visible, the motion vector field appeared very random. Following this observation, it was deduced that the correlation of the motion vector field around each block of data was a good indication that the MC motion vectors which were changed to no-MC vectors were in fact significant, and that the no-MC motion vectors should not be selected in this case.

An exemplary correlation criterion which has been found to provide favorable results is the following. A MC motion vector is considered as correlated if it is almost equal to at least one of the motion vectors of a neighboring block. Neighboring blocks are those blocks of video data located immediately above, under, on the right and on the left of the considered block. There are normally 4 neighboring blocks, except for those blocks located on the edge or the corner of the picture, where there are only 3 or 2 neighboring blocks. By almost equal is meant that the absolute differences of both the x and y coordinates of the motion vectors, expressed in half-pel units, are less or equal to a threshold (a typical threshold is 2). If the MC motion vector is correlated, then the MC motion vector is always selected. If the MC motion vector is not correlated, then a MC/no-MC decision is made according to the relative values of the prediction errors.

In order to implement this new MC/no-MC decision process, it is necessary to memorize or store the motion vectors of 3 rows of blocks of video data, and the motion vectors must be computed one row of blocks in advance of making the MC/no-MC decision based on correlation. However, it is possible to simplify hardware implementation by using a simplified version of this MC/no-MC decision process. In the simplified version, the only neighboring blocks that are considered are the ones located above and on the left of the current block, and possibly the one to the right, since this involves only a very little additional delay. Such a simplified version, although not as effective requires significantly less memory and is a good compromise in terms of cost-to-benefit.

Figure 4:
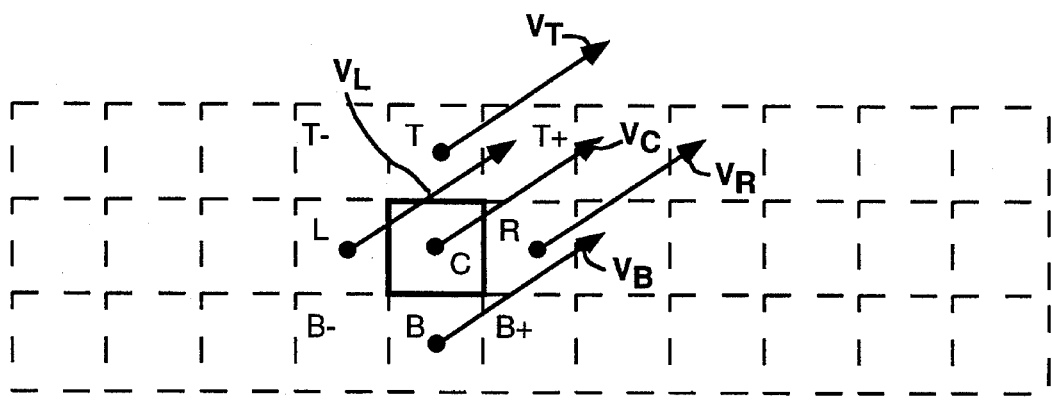
FIGS. 4, 5 and 6 are vector diagrams useful in describing the invention

FIG. 4 illustrates the preferred approach wherein the respective blocks represent blocks of video data corresponding to respective contiguous image areas. A portion of three rows of blocks is shown, with the block designated C being the current block under consideration. The arrows represent motion vectors for the respective blocks. In the preferred embodiment, the motion vector of block C is compared with the motion vectors of blocks T, B, R and L. This requires the storage of motion vectors for at least two rows plus one blocks of data.

Figure 5:
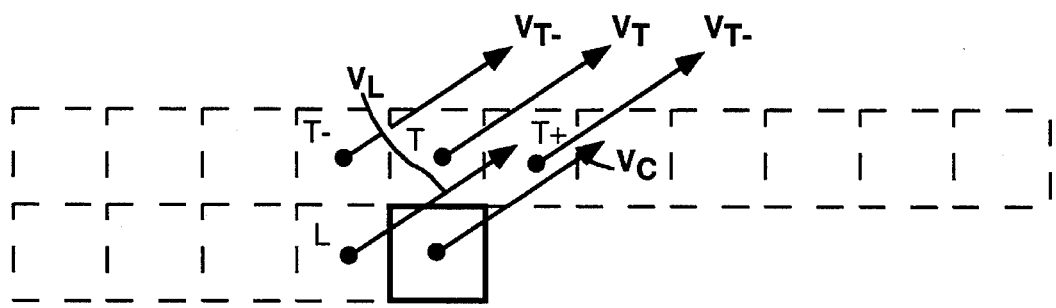

FIG. 5 represents a simplified approach which requires the storage of motion vectors for one row of blocks. FIG. 5 suggests several approaches, all of which are viable and produce acceptable results. One of these approaches is to determine correlation between vector $V_C$ and vectors $V_L$ and $V_T$. Another approach is to check for correlation between vector $V_C$ and vectors $V_{T-}$, $V_T$, $V_{T+}$, and $V_L$. Another approach is to check for correlation between vectors $V_C$ and only $V_L$. This latter approach requires substantially no data storage and provides an improvement over just performing the MC/no-MC decision using the prediction errors.

Figure 6:
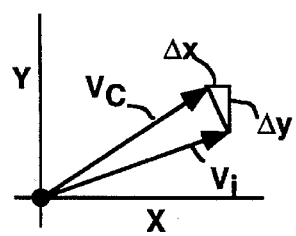

FIG. 6 indicates in part the method of vector correlation. Each vector is presumed to be defined in relative terms describing the differences in coordinates between the location of the target and the predicted blocks in x and y component values. A differencing apparatus determines the magnitude of the differences $\Delta x$ and $\Delta y$ between the vector $V_C$ and the neighboring vectors $V_i$. If both of the absolute differences $|\Delta x_i|$ and $|\Delta y_i|$ determined for a neighboring vector is less than a threshold, the vector $V_C$ is deemed to be correlated with the vector $V_i$, and a change of a MC vector to a no-MC vector is disallowed for the block C.

Note, in the foregoing discussion the video data has been represented as being in blocks, and the motion vectors associated with respective blocks. In the MPEG signal protocol, a plurality of blocks of data are arranged into macroblocks, with a single motion vector associated with a macrobock. In terms of the discussion, with systems such as MPEG, the term macroblock of data is interchangeable with the term block of data.

Figure 1:
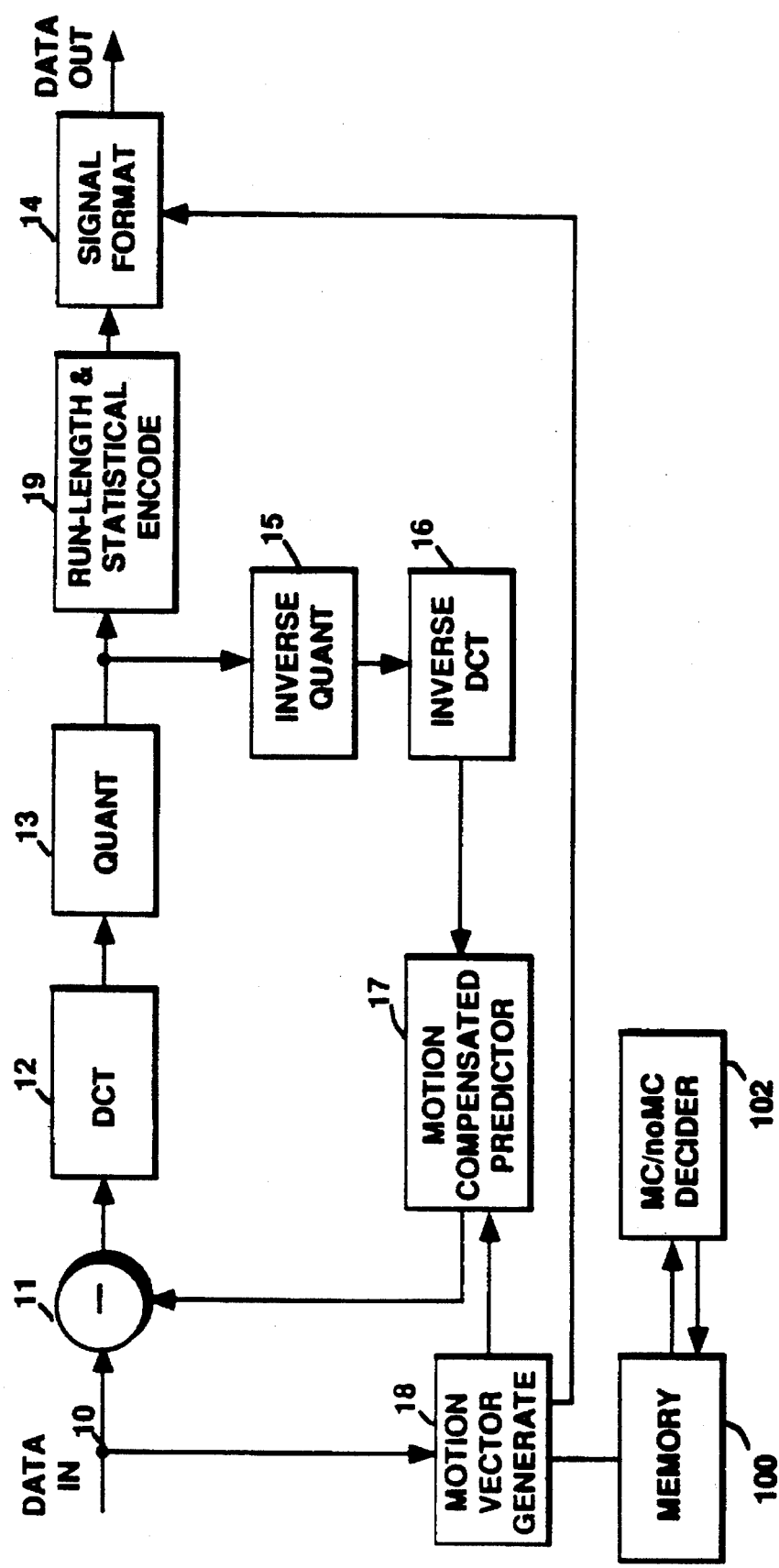
FIG. 1 is a block diagram of a video signal compression apparatus including motion vector generating apparatus embodying the present invention.

FIG. 1 illustrates exemplary apparatus for practicing the invention. In FIG. 1 the elements 10 through 18 typify known motion compensated predictive video signal compression systems. Ignoring for the moment elements 100–102, video signal is applied at terminal 10 and is coupled to one input of a subtracter 11. A video signal representing a predicted image provided by the predictor 17 is applied to a second input terminal of the subtracter 11, which in turn develops image differences or residues. The residues are applied to a discrete cosine transform apparatus 12 which transforms the residues to coefficients representing spatial frequency. The coefficients are quantized by a quantizer 13, and applied to run length and statistical encoder 19. The quantized, run length and statistically encoded data is applied to a signal formatter 14, which arranges the encoded video data and synchronizing signal for storage or transmission.

The quantized data from element 13 is applied to the cascade combination of an inverse quantizer 15 and an inverse discrete cosine transformer 16, which perform the inverse functions of elements 13 and 12 respectively. The output signal provided by the inverse discrete cosine transformer 16 corresponds to the residues provided by the subtracter 11. These residues are coupled to a motion compensated predictor 17 which nominally contains at least one frame of memory. The memory contains the last predicted image. Corresponding blocks of data from the memory in the predictor 17 and the inverse discrete cosine transformer 16 are summed on a pixel basis to generate a new predicted image.

A motion vector generator 18 generates motion vectors according to known block matching techniques. The motion vectors are coupled to the signal formatter 14, wherein they are multiplexed with the blocks of video data to form a compressed data stream.

Figure 3:
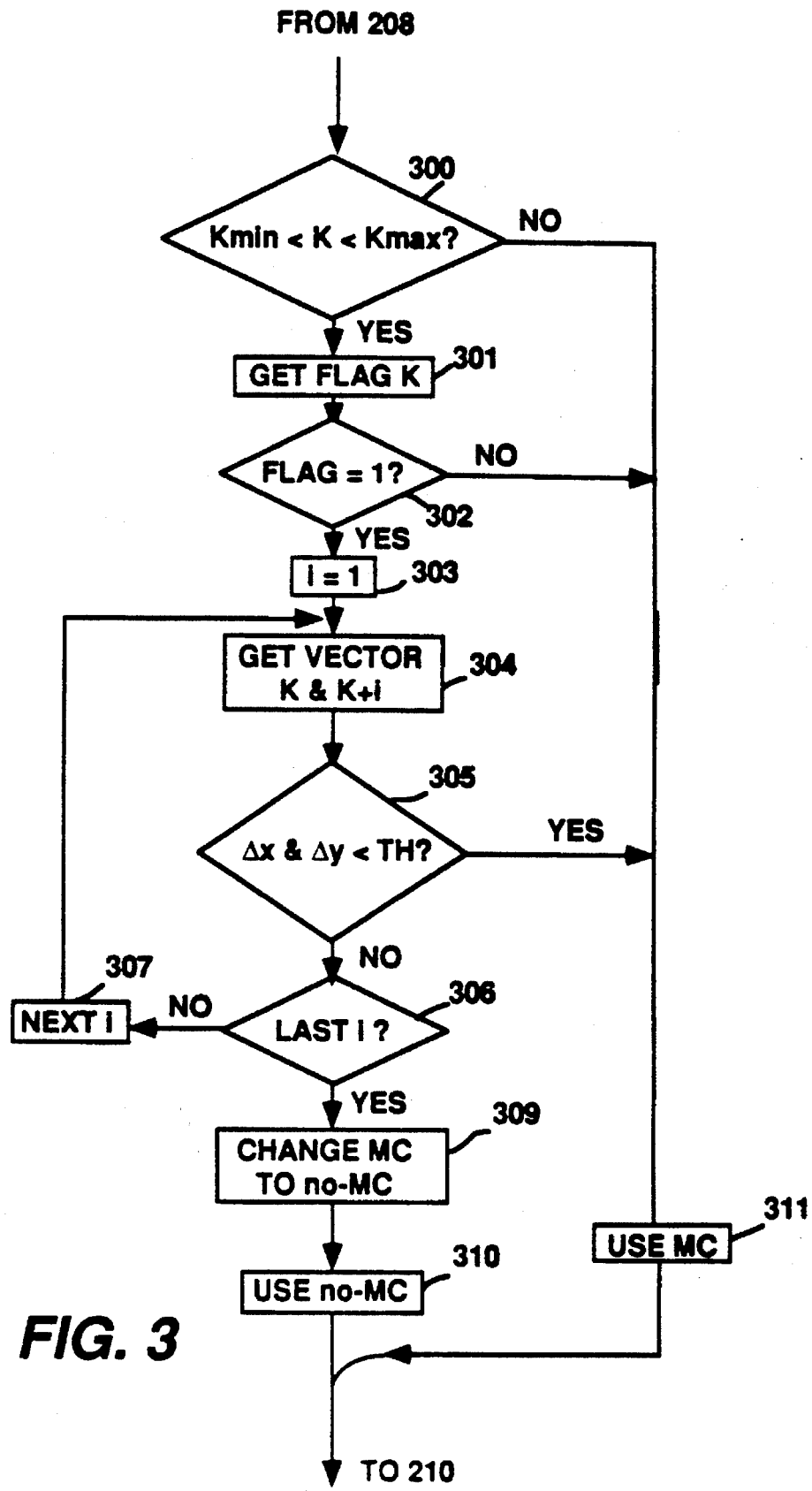
FIG. 3 is a flow chart of the Correlation Decision block of FIG. 2.

In the present invention, the motion vectors are caused to undergo the further correlation test before being applied to the formatter 14. To accomplish the correlation test, the motion vectors for respective blocks are stored within a memory 100. The vector generator 18 performs a MC/no-MC decision based upon prediction errors, but does not convert any MC vectors to no-MC vectors. Rather it generates a flag indicating that a particular MC vector is a candidate to be converted to a no-MC vector. These flags are stored with the associated motion vectors in the memory 100. If the system is arranged to correlate vectors over three rows of blocks as indicated in FIG. 3, the memory 100 must include enough storage to store the vectors and flags for two rows of blocks. Alternatively if the system is arranged to perform vector correlation over two rows of blocks, then the memory 100 must include enough storage space to store one row of vectors and associated flags.

Flags for respective blocks are sequentially accessed from the memory 100 by the MC/no-MC decision element 102. If a flag indicates that a block is a candidate for MC to no-MC conversion, the decision block 102 performs a vector correlation decision. Then, if the respective candidate MC vector is determined to be noncorrelated with any vector associated with a neighboring block, the MC vector is converted or transformed to a no-MC vector.

Figure 2:
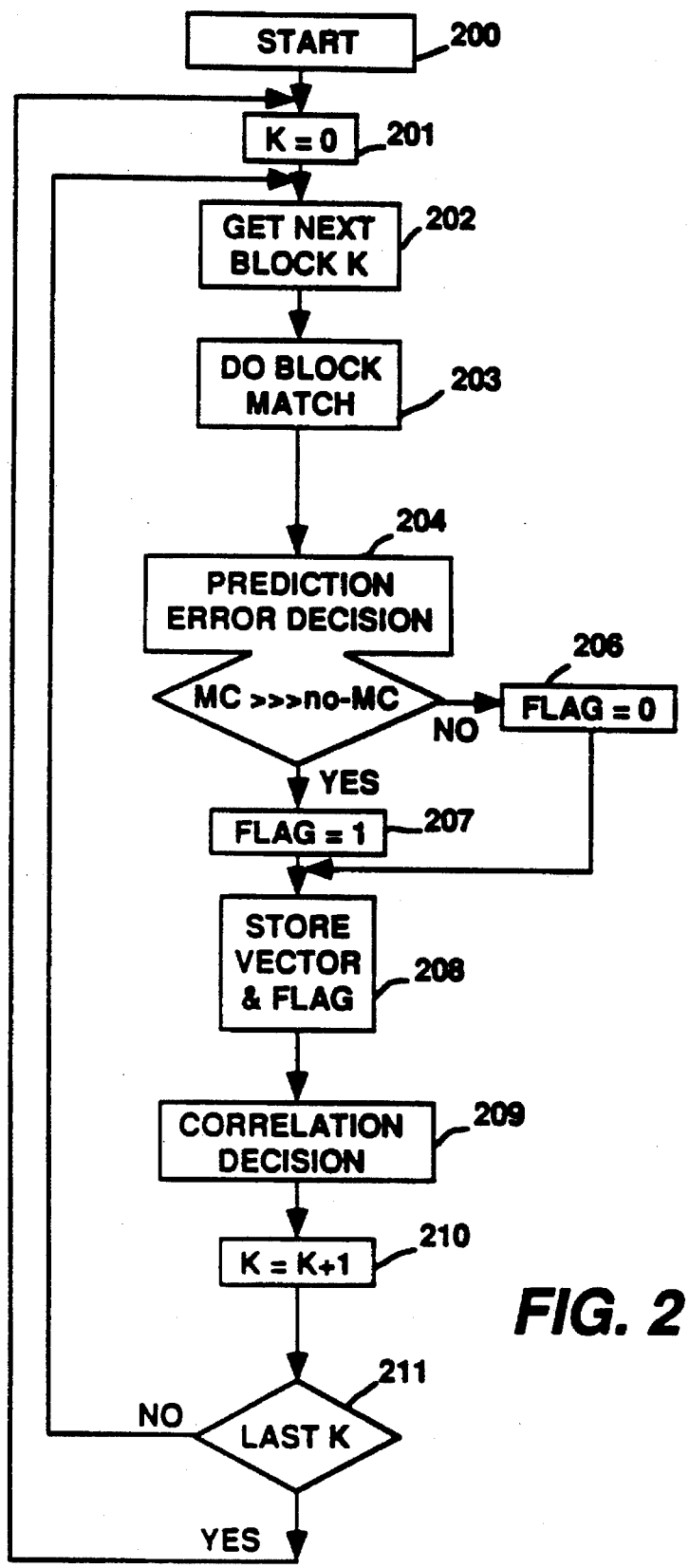
FIG. 2 is a flow chart depicting in part the operation of the motion vector generating apparatus of FIG. 1.

FIG. 2 is a flowchart describing the operation of the motion vector generator. The generator is reset [200] at the beginning of each video field/frame. A block index K is set to zero [201] and the system then fetches [202] the first block. A block matching process is performed [203] in order to generate vectors for the block K. The block matching prediction errors are examined [204] to determine if the vectors for the block K are candidates for a MC vector to no-MC vector conversion. If the vectors are candidates for conversion a flag is set [207] to 1 and if not the flag is set [206] to 0. The vectors for block K and the associated flag is then stored [208] in a memory. A correlation decision is made [209] to determine if the surrounding vectors are correlated and if the flag is 1 or 0, and to convert or not convert the MC vector to a no-MC vector. The index K is then incremented [210] and the incremented index checked [211] to determine if all the blocks in the current frame have been processed. If they have the system returns to step [200], and if not to step 201.

FIG. 3 shows the processes included in the correlation decision step [209]. Depending upon the location of a block within a frame it may or may not be located in a position amenable to vector correlation determination. For example, if the current block under examination is in the topmost row of blocks of a frame, there are no blocks above and hence there are no vectors with which to be conveniently correlated. The first step [300] of the correlation process is therefor to determine if the current block is within a frame area for which it makes sense to do a vector correlation. In the simplest mode this may-be to determine if the block number is large enough to be a block of the second row and small enough to be within the frame.

Once this determination is made the flag associated with block K is accessed from memory [301] and examined [302] to determine whether it is a 1 or 0. If it is a zero (not a candidate for MC/no-MC conversion) nothing need be done and the vectors determined at step 203 are forwarded [311] for utilization in the compression process. On the other hand if the flag is a one, an index i is set to −n [303] where n may be equal to the number of blocks in a row of blocks. Vectors for blocks K and K+i are accessed [304] from memory. A correlation test is performed [305] between the vectors from blocks K and K+i. If there is correlation between the vectors, the vectors associated with block K are not converted to no-MC vectors, and the original vectors are forwarded [311] for utilization in the compression process. If the vectors from blocks K and K+i are not correlated, the index i is examined [306] to determine if all neighboring vectors have been tested. If they have the motion vectors for block K are converted [309] to no-MC vectors, and these are forwarded [310] for use in the compression process. If all of the neighboring vectors have not been tested, the index i is appropriately changed to identify the next neighboring vector to be accessed for correlation testing at step [304]. It should be appreciated that the index i will be changed in a manner to accommodate blocks occurring at the edges of respective frames and to identify the appropriate blocks for which vectors are to be tested, as for example blocks T, L, R, and B when considering block C in FIG. 4.

In certain compression systems, if the motion vectors for a particular block indicate that the target block that most nearly matches the predicted block is co-located therewith, the coding of the block may be designated as non motion compensated and no motion vectors may be associated therewith. This has the same affect as providing a zero-valued motion vector. Hence, in the claims that follow, it is intended that conversion of motion vectors to zero-valued motion vectors should be considered to be equivalent to changing a motion compensated block of data to a non motion compensated coded block with or without motion vectors.

What is claimed:

1. In a video signal compression apparatus of the type which processes video data on a block basis and generates motion vectors for respective blocks via a block matching process, a motion vector processor for converting near zero-valued motion vectors to zero valued motion vectors comprising:

means for identifying non-zero motion vectors which have values less than a predetermined value as candidates for conversion to zero valued motion vectors, hereafter designated candidate motion vectors; and means for determining if a candidate motion vector is correlated with motion vectors of blocks in the immediate neighborhood of the block having said candidate motion vector, and if correlation is not detected, converting said candidate motion vector to a zero valued motion vector and if correlation is detected, not converting said candidate motion vector to a zero valued motion vector.

2. The apparatus set forth in claim 1 wherein said motion vector processor includes:

means for storing motion vectors associated with respective blocks; and means for concurrently accessing motion vectors from a plurality of blocks.

3. The apparatus set forth in claim 1 wherein respective motion vectors include orthogonal components, and said means for determining if a candidate motion vector is correlated with motion vectors of blocks in the immediate neighborhood of the block having said candidate motion vector, includes:

means for determining if respective magnitudes of the differences between respective orthogonal components of motion vectors of neighboring blocks and said candidate motion vector, are both less than a predetermined value.

4. The apparatus set forth in claim 1 wherein said means for determining if a candidate motion vector is correlated with motion vectors of blocks in the immediate neighborhood of the block having said candidate motion vector, includes means for performing a correlative determination with motion vectors of a plurality of blocks neighboring said block having said candidate motion vector, and converting said candidate motion vector if correlation is not detected with respect to a motion vector associated with any one of said neighboring blocks.

5. A video signal compression apparatus, of the type which processes a video signal on a block-by-block basis, and includes means for generating motion vectors by performing block matching and generating and comparing prediction errors said apparatus further including a motion vector processor for converting near zero-valued motion vectors which have values less than a predetermined value to zero valued motion vectors comprising:

means responsive to said prediction errors for identifying ones of said motion vectors (here after designated candidate motion vectors) which do not provide direction to co-located blocks in other fields/frames, that are candidates for conversion to motion vectors which do provide direction to co-located blocks in other fields/frames;

means for determining if said candidate motion vectors are correlated with motion vectors associated with neighboring blocks; and means for converting only candidate motion vectors which are not correlated with said motion vectors associated with neighboring blocks, to motion vectors which provide direction to co-located blocks in other fields/frames.

6. In a video signal compression apparatus of the type which processes video data on a block basis and generates motion vectors associated with respective blocks via a block matching process, an apparatus for determining if motion vectors having values less than a predetermined value are correlated with motion vectors from neighboring blocks, and converting only ones of said motion vectors having values less than a predetermined value and which are not correlated to motion vectors from neighboring blocks, to zero-valued motion vectors.

* * * * *